(12) United States Patent
Fortin et al.

(10) Patent No.: US 12,333,290 B2
(45) Date of Patent: Jun. 17, 2025

(54) AUTOMATIC UPGRADE OF ON-PREMISE SOFTWARE

(71) Applicant: SAP SE, Walldorf (DE)

(72) Inventors: Alexandre Fortin, Paris (FR); Oswald Blassou, Paris (FR); Jonathan Rakotovao, Paris (FR); Florent Moulinier, Paris (FR); Christophe Puget, Paris (FR)

(73) Assignee: SAP SE, Walldorf (DE)

( * ) Notice: Subject to any disclaimer, the term of this patent is extended or adjusted under 35 U.S.C. 154(b) by 156 days.

(21) Appl. No.: 17/820,047

(22) Filed: Aug. 16, 2022

(65) Prior Publication Data

US 2024/0061668 A1 Feb. 22, 2024

(51) Int. Cl.
*G06F 8/65* (2018.01)
*G06F 8/61* (2018.01)

(52) U.S. Cl.
CPC . *G06F 8/65* (2013.01); *G06F 8/61* (2013.01)

(58) Field of Classification Search
CPC ..................................... G06F 8/65; G06F 8/61
See application file for complete search history.

(56) References Cited

U.S. PATENT DOCUMENTS

| | | | | |
|---|---|---|---|---|
| 7,707,573 B1 * | 4/2010 | Marmaros | ................ | G06F 8/61 717/121 |
| 11,080,040 B1 * | 8/2021 | Devaraj | ................ | H04L 67/34 |
| 2007/0204104 A1 * | 8/2007 | Wan | ................ | G06F 11/1464 711/114 |
| 2011/0289499 A1 * | 11/2011 | Haubold | ................ | G06F 8/65 717/173 |
| 2011/0307879 A1 * | 12/2011 | Ishida | ................ | G06F 8/658 717/170 |
| 2013/0110903 A1 * | 5/2013 | Myerscough | ................ | H04L 67/56 709/203 |
| 2013/0238558 A1 * | 9/2013 | Barefoot | ................ | G06F 16/178 707/638 |
| 2017/0031715 A1 * | 2/2017 | Willis | ................ | G06F 9/46 |
| 2019/0258467 A1 * | 8/2019 | Frantz | ................ | G01C 21/3691 |
| 2020/0057628 A1 * | 2/2020 | Sano | ................ | B60R 16/0231 |
| 2020/0065087 A1 * | 2/2020 | Miura | ................ | H04L 67/34 |
| 2020/0225930 A1 * | 7/2020 | Teraoka | ................ | G06F 8/65 |

(Continued)

*Primary Examiner* — Lewis A Bullock, Jr.
*Assistant Examiner* — Theodore E Hebert
(74) *Attorney, Agent, or Firm* — Mintz Levin Cohn Ferris Glovsky and Popeo, P.C.

(57) ABSTRACT

In some implementations, there is provided a method including selecting, based on a usage of computing resources, a download speed for downloading of an available one or more upgrades to one or more computing systems, and downloading, using the selected download speed, the available one or more upgrades to the one or more computing systems; determining an installation priority for installation of the available one or more upgrades to the one or more computing systems, and installing the available one or more upgrades to the one or more computing systems in accordance with the determined installation priority; and determining a time for switching one or more software applications to the installed one or more upgrades, and switching, based on the determined time, the one or more software applications to the installed one or more upgrades. Related systems, methods, and articles of manufacture are also disclosed.

16 Claims, 5 Drawing Sheets

(56) References Cited

U.S. PATENT DOCUMENTS

2021/0173709 A1* 6/2021 Rusev ................. G06F 8/65
2022/0326938 A1* 10/2022 Wang ................. H04W 12/03
2023/0133312 A1* 5/2023 O'Connor ............. G06F 8/61
                                                    717/174

* cited by examiner

| TimeSlot | LastUpdate | NumberOfEvents |
|---|---|---|
| 00:00 | 2021-07-31 00:04:59 | . |
| 00:05 | 2021-07-31 00:09:59 | . |
| (...) | | |
| 08:40 | 2021-07-31 08:44:59 | 21 |
| 08:45 | 2021-07-31 08:49:59 | 42 |
| (...) | | |
| 23:50 | 2021-07-31 23:54:59 | . |
| 23:55 | 2021-07-31 23:59:59 | . |

| NoiseHabit | NumberOfEvents | TimeSlot | LastUpdate |
|---|---|---|---|
| Lower | 11 | 10:40 | 2021-07-31 10:40 |
| Average | 88 | | |
| Higher | 420 | 17:45 | 2021-07-31 17:45 |

AUTOMATIC UPGRADE OF ON-PREMISE SOFTWARE

TECHNICAL FIELD

This disclosure relates generally to data processing and, in particular, to execution of automatic upgrades of on-premise software applications in computing systems.

BACKGROUND

In today's world, many companies rely on software applications to conduct their business. Software applications deal with various aspects of companies' businesses, which can include finances, product development, human resources, customer service, management, and many other aspects. Software applications typically use various forms of content, data, and/or other software applications for specific operational purposes. Software applications periodically require updates and/or upgrades to ensure their operability, compatibility with other applications, as well as ability to withstand malicious attacks. Updating and/or upgrading of software application typically requires downloading of their latest versions to user's system as a package, unpacking them, and executing a download and/or installation manager to install the downloaded version in the user's system. A lot of times, such updates/upgrades are performed during times that are inconvenient to the user and may interrupt other tasks that the user's system may be performing.

SUMMARY

In some implementations, there is provided a method including selecting, using at least one processor, based on a usage of computing resources, a download speed for downloading of an available one or more upgrades to one or more computing systems, and downloading, using the selected download speed, the available one or more upgrades to the one or more computing systems; determining, using the at least one processor, an installation priority for installation of the available one or more upgrades to the one or more computing systems, and installing the available one or more upgrades to the one or more computing systems in accordance with the determined installation priority; and determining, using the at least one processor, a time for switching one or more software applications to the installed one or more upgrades, and switching, based on the determined time, the one or more software applications to the installed one or more upgrades.

In some variations, one or more of the features disclosed herein including the following features can optionally be included in any feasible combination. The one or more computing systems include one or more cloud computing systems. One or more communication channels are configured to communicatively couple the one or more computing systems to one or more repositories storing the one or more upgrades. One or more communication channels may be monitored for the availability of one or more upgrades to the one or more software applications executing in the one or more computing systems. The availability of the one or more upgrades to the one or more software applications may be determined based on the monitoring. A usage of the computing resources of the one or more computing systems by the one or more software applications during the executing may be determined. The determined usage of the computing resources of the one or more computing systems is determined using one or more technical events associated with the executing of the one or more software applications. The download speed is selected based on a number of the one or more technical events. The installation priority is determined based on at least one of the usage of the computing resources and the download speed. The switching is postponed based on at least one of: the usage of the computing resources, the download speed, the installation priority, and any combination thereof.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2a illustrates an exemplary table for recording technical events for a particular tenant's computing system, according to some implementations of the current subject matter;

FIG. 2b illustrates an exemplary table that may be used to summarize technical events and associated noise generated by such events for a particular tenant's computing system, according to some implementations of the current subject matter;

DETAILED DESCRIPTION

Figure 1:
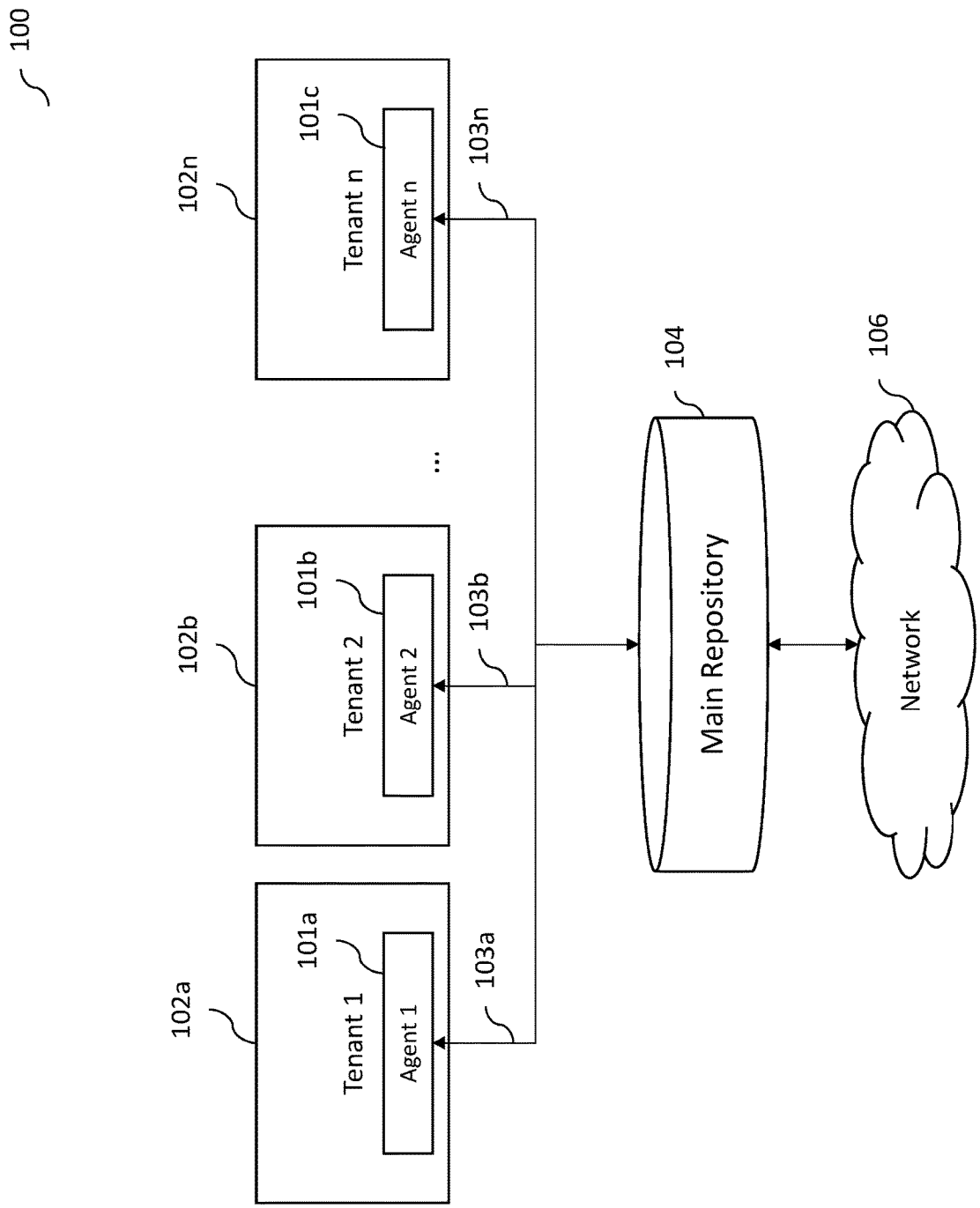
FIG. 1 illustrates an exemplary system for executing software upgrades in computing systems, software applications, etc., according to some implementations of the current subject matter.

To address the deficiencies of currently available solutions, one or more implementations of the current subject matter provide for an ability to provide for automatic update/upgrade of on-premise software applications in computing systems.

Companies use a plurality of processes, applications, and/or services in their operations. Processes, applications, and/or services may be programs that an end-user runs to accomplish certain tasks and may work in conjunction with one or more back-end systems, which may store the data to be worked on, such as, for example, objects and other data, as well as logic for manipulating the data, such as for example transactions or other logic. Examples of back-end systems may include database systems, enterprise resource planning ("ERP") systems, and customer relationship management ("CRM") systems.

Such systems typically have a specific computing system landscape, content delivery capabilities and/or implementation aspects. Each of these have various issues that may be associated with them. For example, computing systems landscape can become increasingly fragmented and complex with addition of new computing components, entities, data processes, etc. Various software applications in such systems may need to be constantly updated and/or upgraded to ensure that there is operability of such software applications as well as their interoperability with other computing components, computing systems, workflows, etc. Upgrading and/or updating of such software applications may interrupt various tasks being performed by such applications and/or their users, which results in a loss of data, time delays, etc.

Updates and/or upgrades of software applications may be performed by downloading and/or depositing of any such updates/upgrades to a main repository that may be communicatively coupled via one or more channels to one or more tenant computing systems (e.g., cloud-based computing systems). Tenant computing systems may include one or more software applications that may be operating within such systems and may be used by their users to perform one or more tasks. Different types of channels may be communicatively coupling tenant systems to the main repository storing software applications and/or their updates/upgrades.

For example, one channel may include a production channel. The production channel may communicatively couple one or more tenant entities (e.g., customer users, partner tenants) to the main repository. Such entities may rely on the up-to-date software for an uninterrupted operation of their own computing systems.

Another example of a channel may include a beta channel. The beta channel may be used to communicatively couple one or more tenant entities to the main repository for the purposes of testing out software applications and may not require such uninterrupted operation of their computing systems.

A further example of a channel may include a pre-beta channel. Such pre-beta channel may be used by tenant entities that may be part of the computing system that incorporates the main repository, where such entities may be internal users of software applications in the main repository and may be testing them to ensure their operability.

A yet further example of a channel may include a development channel. The development channel may be used by developer tenants for development and/or testing of software applications that may be stored and/or stored in a future in the main repository.

Each tenant entity may be associated with a computing system that may be communicatively coupled to the main repository for accessing and/or obtaining of software applications/programs stored therein. Such software applications may then be downloaded, stored, installed, and operate within the tenant's computing systems, thereby becoming on-premise software applications. An agent software (e.g., a desktop agent) may be associated with and/or connected to a particular tenant entity's computing system. The desktop agent tenant's computing system may be further configured to perform orchestration of software bots and act as proxy for downloading the latest version of on-premise software component.

FIG. 1 illustrates an exemplary system 100 for executing software upgrades in computing systems, software applications, etc., according to some implementations of the current subject matter. The system 100 may be configured to operate in one or more clustered computing environments (e.g., Kubernetes), one or more cloud environments, etc. It may include one or more tenants, users, entities, applications, etc. 102 (a, b, n) (e.g., tenant 1, tenant 2, . . . , tenant n) and a main repository 104. The main repository 104 may be communicatively coupled to an external network 106 that may be used for downloading and storing software applications and/or upgrades to such application in the main repository.

The tenants 102 and/or the repository 104 may include one or more processors, one or more memories, and/or any combination of hardware/software, and may be configured to execute an on-premise (e.g., at a particular tenant 102) upgrade of a software application. Each tenant 102 may include a respective agent component 1, n 101 (a, b, n). An agent component or an agent 101 may refer to a software code that may be configured to perform a particular function, a piece and/or a set of data (e.g., data unique to a particular user and/or data available to a plurality of users) and/or configuration data used to create, modify, etc. one or more software functionalities associated with a particular software application upgrade and/or a portion of such upgrade. The agent(s) 101 and/or any other parts of the system 100 may include one or more artificial intelligence and/or learning capabilities that may rely on and/or use various data, e.g., data related to and/or identifying one or more software application upgrades that may have been previously generated.

The elements of the system 100 may be communicatively coupled using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

In some implementations, each agent 101 and/or each tenant 102 may be communicatively coupled to the main repository 104 using one or more respective channels 103 (a, b, n). The channels 103 may include at least one of the following: a production channel, a beta channel, a pre-beta channel, a development channel, and/or any combination thereof. For example, tenant 102a may be a customer of a particular system (e.g., connected via the network 106) and may require regular updates to the software applications that it uses and hence, the channel 103a may be a production channel.

Moreover, the elements of the system 100 may include any combination of hardware and/or software. In some implementations, the elements may be disposed on one or more computing devices, such as, server(s), database(s), personal computer(s), laptop(s), cellular telephone(s), smartphone(s), tablet computer(s), and/or any other computing devices and/or any combination thereof. In some implementations, the elements may be disposed on a single computing device and/or can be part of a single communications network. Alternatively, the elements may be separately located from one another.

In some implementations, each agent 101 may be configured to execute monitoring functions of the software applications being installed and/or used by its respective tenant. Such monitoring may be executed constantly, on periodic basis, at a predetermined time, and/or automatically. For example, the agent 101 may be configured to gather data related to times when each software application in the tenant 102's system is performing various functionalities and/or when executions of such functionalities are most active and/or least active. Alternatively, or in addition, the agent 101 may be "always on" and/or become active (e.g., begins monitoring) when a particular application begins executing functionalities. Further, as part of the monitoring, the agent may also assess version of the software application and cause a query to be generated to the main repository to determine whether an upgrade to the software application is available. If one is available, the agent may determine the most convenient time for upgrading the software application. For example, an upgrade may be executed/performed when the software application is not active and the tenant's computing system is not consuming substantial computing resources (e.g., when users of the tenant's computing system are not actively performing various tasks using software applications of that tenant's computing system).

Further, the agent 101 may also be configured to determine criticality of the available upgrade to the software application. If the update is critical (e.g., required for proper operation of the software application, a security patch to address vulnerability of the software application and/or tenant's computing system, etc.), the agent 101 may determine that an upgrade needs to be performed as soon as possible and/or when the software application is closed.

Alternatively, or in addition, the agent 101 may be configured to automatically receive a notification from the main repository 104 that a new version of a particular software application is available. Based on the received notification, the agent 101 may determine when to perform the upgrade.

In some implementations, the agent 101, as part of the monitoring, may be configured to distinguish between one or more technical events and noise events generated by and/or associated with execution of one or more functionalities of a software application in the tenant's 102 system. A technical event may refer to at least one of the following software application's and/or program's events: loading a program, focusing a program, unfocusing a program, unloading a program, loading a user interface (UI) element, unloading a UI element, changing a UI element, clicking a UI element, and/or any other types of events. Execution of such technical events may generate noise and/or stress on the tenant's 102 computing system. This may include consumption/release/etc. of input/output resources, compute resources, memory, etc. The noise may be measured and stored while the agent 101 is performing one or more of its functionalities.

FIG. 2a illustrates an exemplary table 200 for recording technical events for a particular tenant's 102 computing system, according to some implementations of the current subject matter. The table 200 may be generated and/or stored by the agent 101 for each tenant 102 and/or each software application in the tenant's 102 computing system. The table 200 may include a time slot column 202, a last update column 204, and a number of events column 206. The time slot column 202 may include one or more times (e.g., in 5 minute increments). The last update column 204 may include an identification of date and time when the last update to specific data, program, etc. in the tenant's 102 computing system may have been performed. The column 206 may indicate a number of events that may have occurred associated with a particular update.

For example, at 8:40 time slot, the agent 101 may have determined that the last update occurred at 2021-07-31 08:44:59 and generated 21 events. As can be understood, any other format of table 200 may be used. The table 200 may be generated by the agent 101 to record events occurring during a predetermined period of time (e.g., 24 hours or any other period of time). In some implementations, one or more machine learning algorithms may be executed using table 200 to "learn" habits of specific software applications and/or computing components of the computing system of the tenant 102.

FIG. 2b illustrates an exemplary table 210 that may be used to summarize technical events and associated noise generated by such events for a particular tenant's 102 computing system, according to some implementations of the current subject matter. The table 210 may include a noise habit column 212, a number of events column 214, a time slot column 216, and a last update column 218. Such noise habit information may be updated periodically (e.g., daily, hourly, etc.), automatically, and at a predetermined time. As shown in FIG. 2b, the highest amount of noise occurred at 17:45 time slot corresponding to the last update time of 2021-07-31 17:45 and 420 technical events that have occurred.

Figure 3:
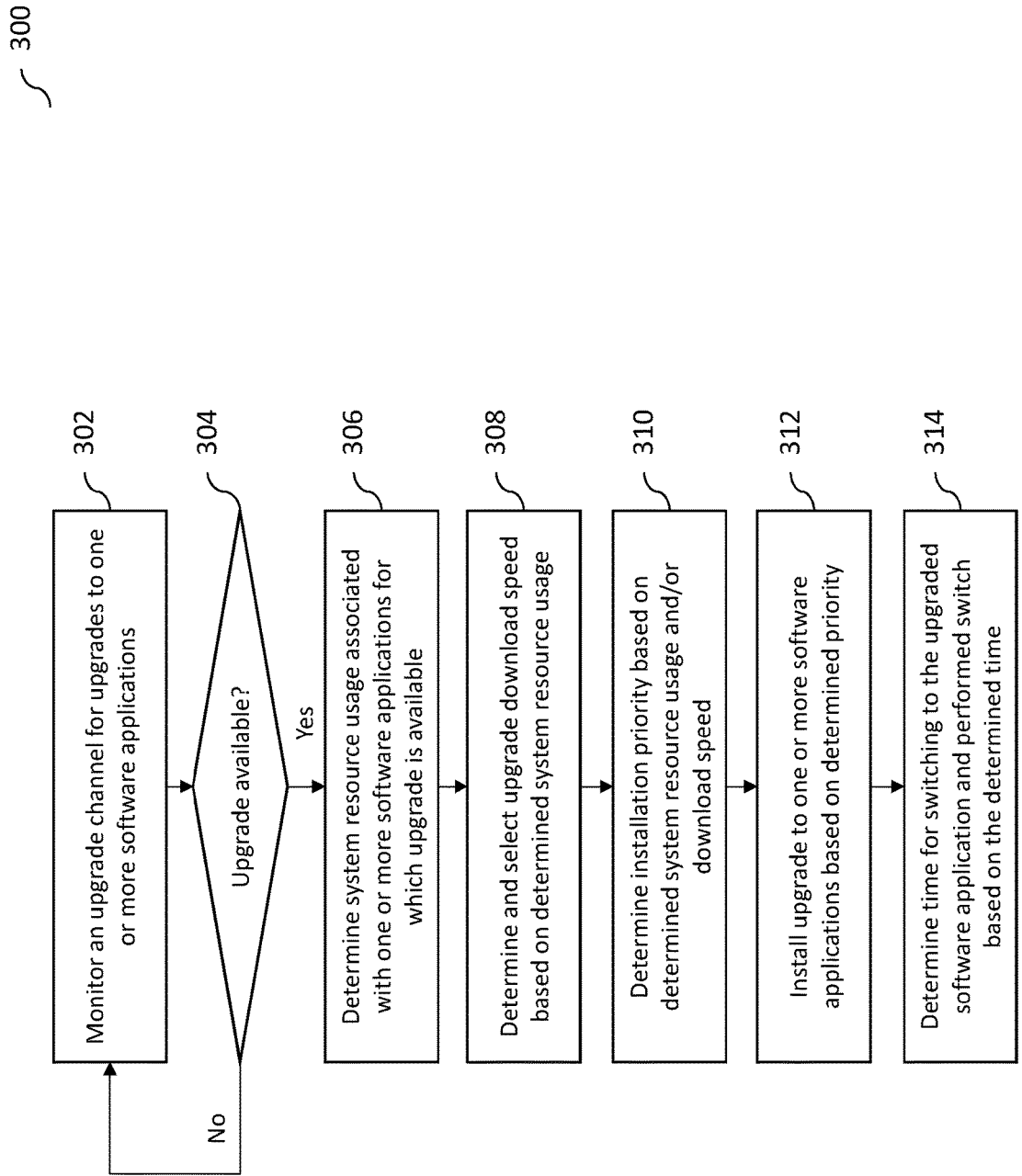
FIG. 3 illustrates an exemplary process for executing software upgrades in computing systems, software applications, etc., according to some implementations of the current subject matter.

FIG. 3 illustrates an exemplary process 300 for executing software upgrades in computing systems, software applications, etc., according to some implementations of the current subject matter. The process 300 may be executed by the system 100 shown in FIG. 1 and, in particular, by one or more agents 101. At 302, the agent 101 may be configured to monitor one or more channels (e.g., channels 103) for availability of upgrades from the main repository 104 to one or more software applications that may have been installed on the tenant 102's computing system. The upgrades may be critical or high priority (e.g., required for functionality of software applications, patch a vulnerability, etc.), regular (e.g., monthly updates to various data used by the software applications), and/or optional (e.g., not required but may be helpful for operation of the software application), and/or any other type of update.

If, at 304, an upgrade to one or more software applications is not available, the agent 101 may continue monitoring channels 103. However, if, at 304, an upgrade is available, the process 300 may be configured to proceed to 306, where the agent 101 may determine system resource usage associated with one or more software applications for which the agent 101 determined that an upgrade is available. The resource usage may be determined using analysis of one or more technical events associated with the software applications. For example, the agent 101 may, based on the analysis of technical events (as for example shown by tables in FIGS. 2a-b) group resource usage into the following case categories:

Case A—heavy resource usage by the software applications, which may correspond to technical events happening frequently (e.g., every minute). In this case, the agent 101 may determine that a particular determined upgrade may be downloaded at a low speed.

Case B—regular resource usage by the software applications, which may correspond to technical events happening less frequently than case A (e.g., every 5 minutes). In this case, the agent 101 may determine that a particular determined upgrade may be downloaded at half of full speed.

Case C—resources are not used during a prolonged period of time (e.g., more than 15 minutes in a row). In this case, the agent 101 may determine that a particular determined upgrade may be downloaded at full speed.

Case D—a mitigation case, where an extended period of time (e.g., up to 7 days) may be allowed to postpone starting of the download of the upgrade.

Once the system resource usage has been assessed, the agent 101 may be configured to determine and select a particular download speed for the available upgrade, at 308. For example, the agent 101 may select one or more of the download speeds in accordance with one or more cases A-D. As can be understood, any other download speeds may be used.

At 310, the agent 101 may be configured to determine installation priority in accordance with the determined system resource usage and/or download speed (e.g., cases A-D above) that has been used to download the upgrade. The priorities may range from high to low, where high priority installation may require immediate installation of the upgrade (e.g., when a security patch is available) and/or as soon as system resource are released by the software application. A low priority installation may be invoked upon determination that the tenant 102's computing system's resources are not consumed by any of the software application and thus, may be available for installation of the upgrade. This may be used for regular upgrades to software applications and/or data associated therewith. A normal installation priority may be between the high and the low installation priorities. For example, using the download speeds in cases A-D, the installation priority for each such case may be as follows:

Case A—the agent 101 may initiate installation process in low priority mode.
Case B—the agent 101 may initiate installation process using a below normal mode.
Case C—the agent 101 may initiate installation process in a normal mode.
Case D—the agent 101 may initiate installation process in a low priority mode.

Once installation priority has been determined, the agent 101 may initiate the installation of the upgrade to the tenant 102's computing system, at 312. In some implementations, the installation process may be delayed by the agent 101 until it determines that the table 210 shown in FIG. 2b includes NULL values in the number of events column 214. This may occur when the tenant 102's computing system has been shut down and/or restarted.

At 314, the agent 101 may be configured to determine a time for switching the current version of the software application(s) to the upgraded, downloaded and installed version of the software application(s). Such switch may occur in accordance with the same rules defined for the downloading and installation priorities (e.g., in accordance with cases A-D) described above. For example, the switching may be executed as follows:

Case A—the agent 101 may postpone the switch.
Case B—the agent 101 may postpone the switch.
Case C—the agent 101 may execute the switch.
Case D—the agent 101 may execute the switch when the lower activity/usage of computing resources has been reached and/or determined by the agent 101

Figure 4:
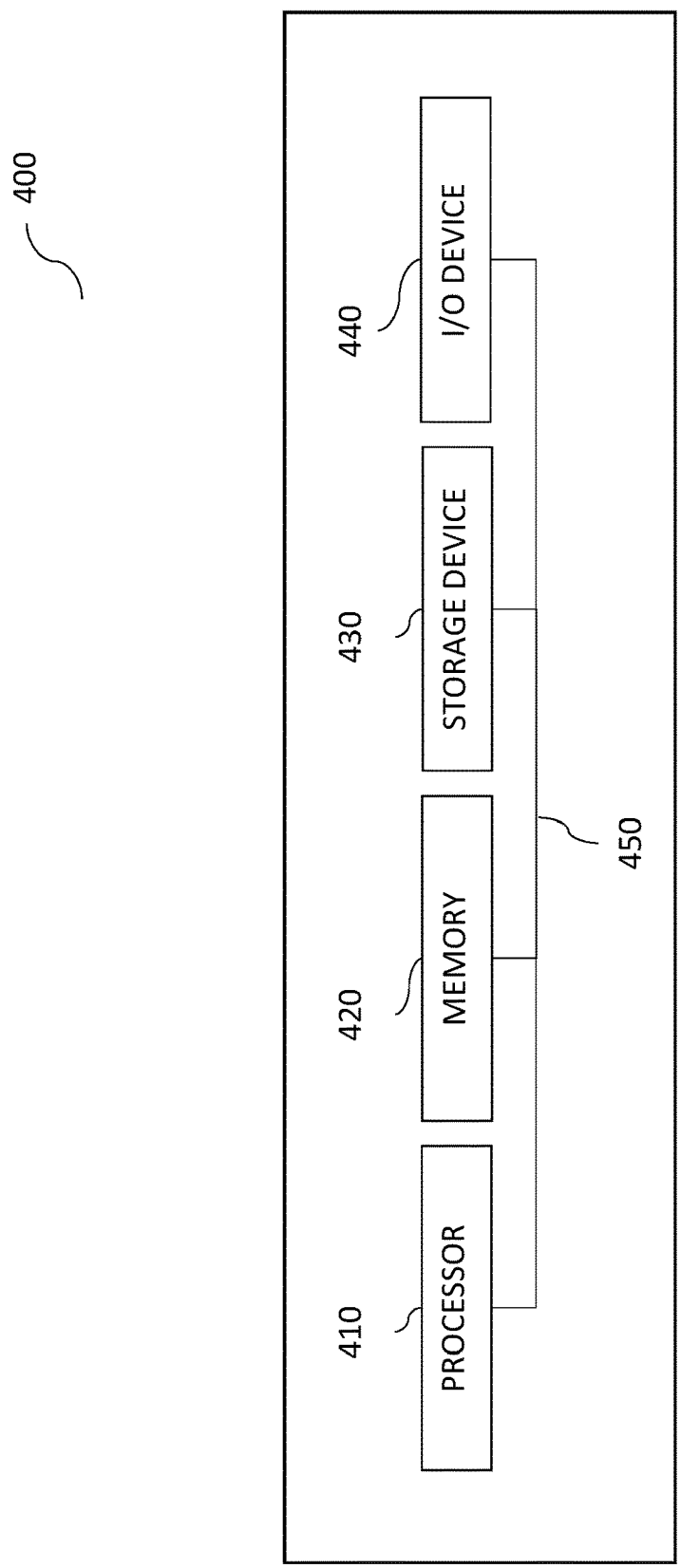
FIG. 4 illustrates an exemplary system, according to some implementations of the current subject matter.

In some implementations, the current subject matter can be configured to be implemented in a system 400, as shown in FIG. 4. The system 400 can include a processor 410, a memory 420, a storage device 430, and an input/output device 440. Each of the components 410, 420, 430 and 440 can be interconnected using a system bus 450. The processor 410 can be configured to process instructions for execution within the system 400. In some implementations, the processor 410 can be a single-threaded processor. In alternate implementations, the processor 410 can be a multi-threaded processor. The processor 410 can be further configured to process instructions stored in the memory 420 or on the storage device 430, including receiving or sending information through the input/output device 440. The memory 420 can store information within the system 400. In some implementations, the memory 420 can be a computer-readable medium. In alternate implementations, the memory 420 can be a volatile memory unit. In yet some implementations, the memory 420 can be a non-volatile memory unit. The storage device 430 can be capable of providing mass storage for the system 400. In some implementations, the storage device 430 can be a computer-readable medium. In alternate implementations, the storage device 430 can be a floppy disk device, a hard disk device, an optical disk device, a tape device, non-volatile solid state memory, or any other type of storage device. The input/output device 440 can be configured to provide input/output operations for the system 400. In some implementations, the input/output device 440 can include a keyboard and/or pointing device. In alternate implementations, the input/output device 440 can include a display unit for displaying graphical user interfaces.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A computer-implemented method, comprising: selecting, using at least one processor, based on a usage of computing resources, a download speed for downloading of an available one or more upgrades to one or more computing systems, and downloading, using the selected download speed, the available one or more upgrades to the one or more computing systems; determining, using the at least one processor, an installation priority for installation of the available one or more upgrades to the one or more computing systems, and installing the available one or more upgrades to the one or more computing systems in accordance with the determined installation priority; and determining, using the at least one processor, a time for switching one or more software applications to the installed one or more upgrades, and switching, based on the determined time, the one or more software applications to the installed one or more upgrades.

Example 2: The method according to Example 1, wherein the one or more computing systems include one or more cloud computing systems.

Example 3: The method according to any of Examples 1-2, wherein one or more communication channels are configured to communicatively couple the one or more computing systems to one or more repositories storing the one or more upgrades.

Example 4: The method according to any of Examples 1-3 further comprising: monitoring, using the at least one processor, one or more communication channels for the availability of one or more upgrades to the one or more software applications executing in the one or more computing systems.

Example 5: The method according to any of Examples 1-4 further comprising; determining, using the at least one processor, based on the monitoring, the availability of the one or more upgrades to the one or more software applications.

Example 6: The method according to any of Examples 1-5 further comprising; determining, using the at least one processor, a usage of the computing resources of the one or more computing systems by the one or more software applications during the executing;

Example 7: The method according to any of Examples 1-6 wherein the determined usage of the computing resources of the one or more computing systems is determined using one or more technical events associated with the executing of the one or more software applications.

Example 8: The method according to any of Examples 1-7, wherein the download speed is selected based on a number of the one or more technical events.

Example 9: The method according to any of Examples 1-8, wherein the installation priority is determined based on at least one of the usage of the computing resources and the download speed.

Example 10: The method according to any of Examples 1-9 further comprising: postponing the switching based on at least one of: the usage of the computing resources, the download speed, the installation priority, and any combination thereof.

Example 11. A system comprising: at least one processor; and at least one memory including instructions which when executed by the at least one processor causes operations comprising: selecting, using at least one processor, based on a usage of computing resources, a download speed for downloading of an available one or more upgrades to one or more computing systems, and downloading, using the selected download speed, the available one or more upgrades to the one or more computing systems; determining, using the at least one processor, an installation priority for installation of the available one or more upgrades to the one or more computing systems, and installing the available one or more upgrades to the one or more computing systems in accordance with the determined installation priority; and determining, using the at least one processor, a time for switching one or more software applications to the installed one or more upgrades, and switching, based on the determined time, the one or more software applications to the installed one or more upgrades.

Example 12: The system according to Example 11, wherein the one or more computing systems include one or more cloud computing systems.

Example 13: The system according to any of Examples 11-12, wherein one or more communication channels are configured to communicatively couple the one or more computing systems to one or more repositories storing the one or more upgrades.

Example 14: The system according to any of Examples 11-13 further comprising: monitoring, using the at least one processor, one or more communication channels for the availability of one or more upgrades to the one or more software applications executing in the one or more computing systems.

Example 15: The system according to any of Examples 11-14 further comprising; determining, using the at least one processor, based on the monitoring, the availability of the one or more upgrades to the one or more software applications.

Example 16: The system according to any of Examples 11-15 further comprising; determining, using the at least one processor, a usage of the computing resources of the one or more computing systems by the one or more software applications during the executing;

Example 17: The system according to any of Examples 11-16, wherein the determined usage of the computing resources of the one or more computing systems is determined using one or more technical events associated with the executing of the one or more software applications.

Example 18: The system according to any of Examples 11-17, wherein the download speed is selected based on a number of the one or more technical events.

Example 19: The system according to any of Examples 11-18, wherein the installation priority is determined based on at least one of the usage of the computing resources and the download speed.

Example 20: A non-transitory computer readable storage medium including instructions which when executed by at least one processor causes operations comprising: selecting, using at least one processor, based on a usage of computing resources, a download speed for downloading of an available one or more upgrades to one or more computing systems, and downloading, using the selected download speed, the available one or more upgrades to the one or more computing systems; determining, using the at least one processor, an installation priority for installation of the available one or more upgrades to the one or more computing systems, and installing the available one or more upgrades to the one or more computing systems in accordance with the determined installation priority; and determining, using the at least one processor, a time for switching one or more software applications to the installed one or more upgrades, and switching, based on the determined time, the one or more software applications to the installed one or more upgrades.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
    determining, using at least one processor, a usage of computing resources based on an analysis of one or more technical events associated with one or more software applications for which one or more upgrades are available, wherein a first column of a table associated with the usage of the computing resources records a number of technical events that have occurred in a particular time slot and wherein the first column of the table does not contain at least one NULL value;
    grouping the usage of the computing resources into one of a plurality of case categories based on the analysis of the one or more technical events associated with the one or more software applications;
    selecting, using the at least one processor, based on the one of the plurality of case categories to which usage of the computing resources is grouped, a download speed for downloading of the available one or more upgrades to one or more computing systems, and downloading, using the selected download speed, the available one or more upgrades to the one or more computing systems;
    determining, using the at least one processor, an installation priority for installation of the available one or more upgrades to the one or more software applications, and installing the available one or more upgrades to the one or more software applications in accordance with the determined installation priority;
    determining, using the at least one processor, a time for switching the one or more software applications to the installed one or more upgrades based on the usage of the computing resources associated with the one or more software applications, and switching, based on the determined time, the one or more software applications to the installed one or more upgrades;
determining, using the at least one processor, at least one NULL value has been added to the first column of the table; and
delaying the time for switching the one or more software applications to the installed one or more upgrades until the table associated with the usage of the computing resources includes the at least one NULL value in the first column.

2. The method according to claim 1 further comprising distinguishing between the one or more technical events and noise events associated with execution of one or more functionalities of the one or more software applications.

3. The method according to claim 2 further comprising:
monitoring, using the at least one processor, one or more communication channels for the availability of one or more upgrades to the one or more software applications executing in the one or more computing systems; and
determining, using the at least one processor, based on the monitoring, the availability of the one or more upgrades to the one or more software applications.

4. The method according to claim 2 further comprising determining, using the at least one processor, the usage of the computing resources of the one or more computing systems by recording one or more technical events in one or more tables.

5. The method according to claim 4, wherein the one or more tables are used to summarize the one or more technical events and associated noise generated by the one or more technical events.

6. The method according to claim 5, wherein the download speed is selected based on a number of the one or more technical events.

7. The method according to claim 6, wherein the installation priority is determined based on at least one of the usage of the computing resources and the download speed.

8. The method according to claim 6 further comprising:
postponing the switching based on at least one of: the usage of the computing resources, the download speed, the installation priority, and any combination thereof.

9. A system comprising:
at least one processor; and
at least one memory including instructions which when executed by the at least one processor causes operations comprising:
determining, using at least one processor, a usage of computing resources based on an analysis of one or more technical events associated with one or more software applications for which one or more upgrades are available, wherein a first column of a table associated with the usage of the computing resources records a number of technical events that have occurred in a particular time slot and wherein the first column of the table does not contain at least one NULL value;
grouping the usage of the computing resources into one of a plurality of case categories based on the analysis of the one or more technical events associated with the one or more software applications;
selecting, using the at least one processor, based on the one of the plurality of case categories to which usage of the computing resources is grouped, a download speed for downloading of the available one or more upgrades to one or more computing systems, and downloading, using the selected download speed, the available one or more upgrades to the one or more computing systems;
determining, using the at least one processor, an installation priority for installation of the available one or more upgrades to the one or more software applications, and installing the available one or more upgrades to the one or more software applications in accordance with the determined installation priority;
determining, using the at least one processor, a time for switching the one or more software applications to the installed one or more upgrades based on the usage of the computing resources associated with the one or more software applications, and switching, based on the determined time, the one or more software applications to the installed one or more upgrades;
determining, using the at least one processor, at least one NULL value has been added to the first column of the table; and
delaying the time for switching the one or more software applications to the installed one or more upgrades until the table associated with the usage of the computing resources includes the at least one NULL value in the first column.

10. The system according to claim 9, wherein the operations further comprise distinguishing between the one or more technical events and noise events associated with execution of one or more functionalities of the one or more software applications.

11. The system according to claim 10, wherein the operations further comprise:
monitoring, using the at least one processor, one or more communication channels for the availability of one or more upgrades to the one or more software applications executing in the one or more computing systems; and
determining, using the at least one processor, based on the monitoring, the availability of the one or more upgrades to the one or more software applications.

12. The system according to claim 10, wherein the operations further comprise
determining, using the at least one processor, the usage of the computing resources of the one or more computing systems by recording one or more technical events in one or more tables.

13. The system according to claim 12, wherein the one or more tables are used to summarize the one or more technical events and associated noise generated by the one or more technical events.

14. The system according to claim 13, wherein the download speed is selected based on a number of the one or more technical events.

15. The system according to claim 14, wherein the installation priority is determined based on at least one of the usage of the computing resources and the download speed.

16. A non-transitory computer readable storage medium including instructions which when executed by at least one processor causes operations comprising:
determining, using at least one processor, a usage of computing resources based on an analysis of one or more technical events associated with one or more software applications for which one or more upgrades are available, wherein a first column of a table associated with the usage of the computing resources records a number of technical events that have occurred in a particular time slot and wherein the first column of the table does not contain at least one NULL value;

grouping the usage of the computing resources into one of a plurality of case categories based on the analysis of the one or more technical events associated with the one or more software applications;

selecting, using the at least one processor, based on the one of the plurality of case categories to which usage of the computing resources is grouped, a download speed for downloading of the available one or more upgrades to one or more computing systems, and downloading, using the selected download speed, the available one or more upgrades to the one or more computing systems;

determining, using the at least one processor, an installation priority for installation of the available one or more upgrades to the one or more software applications, and installing the available one or more upgrades to the one or more software applications in accordance with the determined installation priority;

determining, using the at least one processor, a time for switching the one or more software applications to the installed one or more upgrades based on the usage of the computing resources associated with the one or more software applications, and switching, based on the determined time, the one or more software applications to the installed one or more upgrades;

determining, using the at least one processor, at least one NULL value has been added to the first column of the table; and delaying the time for switching the one or more software applications to the installed one or more upgrades until the table associated with the usage of the computing resources includes the at least one NULL value in the first column.

* * * * *